US012779335B2

(12) United States Patent
Zhao

(10) Patent No.: US 12,779,335 B2
(45) Date of Patent: Nov. 3, 2026

(54) METHOD FOR PREVENTING MODEL PENETRATION, ELECTRONIC DEVICE AND STORAGE MEDIUM

(71) Applicant: NETEASE (HANGZHOU) NETWORK CO., LTD., Hangzhou (CN)

(72) Inventor: Qi Zhao, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 204 days.

(21) Appl. No.: 18/716,957

(22) PCT Filed: Jun. 20, 2022

(86) PCT No.: PCT/CN2022/099807
§ 371 (c)(1),
(2) Date: Jun. 6, 2024

(87) PCT Pub. No.: WO2023/151211
PCT Pub. Date: Aug. 17, 2023

(65) Prior Publication Data
US 2025/0041727 A1 Feb. 6, 2025

(30) Foreign Application Priority Data
Feb. 14, 2022 (CN) ........................ 202210135013.4

(51) Int. Cl.
*A63F 13/57* (2014.01)

(52) U.S. Cl.
CPC .................................. *A63F 13/57* (2014.09)

(58) Field of Classification Search
CPC .. A63F 13/57; A63F 13/52; A63F 2300/6653; G06T 15/40
(Continued)

(56) References Cited

U.S. PATENT DOCUMENTS 11,615,601 B2 * 3/2023 Makeev .................. G06T 19/20 345/419
12,374,067 B2 * 7/2025 Makeev .................. G06T 19/20
(Continued)

FOREIGN PATENT DOCUMENTS

CN 109568961 A 4/2019
CN 112070873 A 12/2020
(Continued)

OTHER PUBLICATIONS

Notice of Allowance dated Jan. 8, 2025 of Chinese Application No. 202210135013.4.
(Continued)

*Primary Examiner* — Pierre E Elisca
(74) *Attorney, Agent, or Firm* — Qinghong Xu

(57) ABSTRACT

A method for preventing model penetration, including: determining a target sub-model of a model to be rendered, where the model to be rendered includes a plurality of sub-models, the target sub-model is one of the plurality of sub-models, and a layer level number of the target sub-model is a target layer level number; performing rendering on the target sub-model, and storing a display position of a front pixel point corresponding to the target sub-model into a buffer area; and removing, during performing rendering on a first sub-model in the model to be rendered, a pixel point of the first sub-model, where, a display position corresponding to the pixel point of the first sub-model is the same as the display position stored in the buffer area, and the first sub-model is one of the plurality of sub-models and is different from the target sub-model.

20 Claims, 5 Drawing Sheets

(58) Field of Classification Search
USPC .............................................................. 463/31
See application file for complete search history.

(56) References Cited

U.S. PATENT DOCUMENTS

| | | | | |
|---|---|---|---|---|
| 2007/0268290 | A1 | 11/2007 | Naoi | |
| 2021/0118225 | A1 | 4/2021 | Li | |
| 2022/0292791 | A1* | 9/2022 | Makeev | G06T 19/20 |
| 2023/0298297 | A1* | 9/2023 | Makeev | G06T 19/20 |

FOREIGN PATENT DOCUMENTS

| | | | |
|---|---|---|---|
| CN | 112316425 | A | 2/2021 |
| CN | 112691381 | A | 4/2021 |
| CN | 112933599 | A | 6/2021 |
| CN | 113498532 | A | 10/2021 |
| CN | 114470766 | A | 5/2022 |

OTHER PUBLICATIONS

International Search Report dated Nov. 10, 2022 of International Application No. PCT/CN2022/099807.

* cited by examiner

METHOD FOR PREVENTING MODEL PENETRATION, ELECTRONIC DEVICE AND STORAGE MEDIUM

CROSS REFERENCE TO RELATED APPLICATIONS

The present application is a National Stage Application of International Application No. PCT/CN2022/099807 filed on Jun. 20, 2022 which is based upon and claims priority to Chinese Patent Application No. 202210135013.4 entitled "Method and apparatus for preventing model penetration, electronic device, and storage medium", filed on Feb. 14, 2022, and the entire contents of both of which are incorporated herein by reference for all purposes.

TECHNICAL FIELD

The present disclosure relates to the field of computer technology, and in particular, to a method and apparatus for preventing model penetration, an electronic device, and a storage medium.

BACKGROUND

In 3D games, it often occurs that the inner layer clothing of the character model penetrates into the outside of the outer layer clothing, or the skin of the character penetrates into the outside of the clothing, resulting in a damage to the game quality and poor user experience.

In order to prevent penetration of clothing of the character model, there are generally two ways in the related art. The first manner is to maintain reasonable distances between the clothing and the character body, or between the outer-layer clothing and the inner-layer clothing, by adjusting the physical parameters of the clothing and the character body as well as the outer-layer clothing and the inner-layer clothing.

SUMMARY

A method for preventing model penetration, including:

determining a target sub-model of a model to be rendered, where the model to be rendered includes a plurality of sub-models, each of the plurality of sub-models includes a layer level, the target sub-model is one of the plurality of sub-models, and a layer level number of the target sub-model is a target layer level number;

performing rendering on the target sub-model, and storing a display position of a front pixel point corresponding to the target sub-model into a buffer area; and removing, during performing rendering on a first sub-model in the model to be rendered, a pixel point of the first sub-model, where the pixel point of the first sub-model is one of pixel points corresponding to the first sub-model, a display position corresponding to the pixel point of the first sub-model is the same as the display position stored in the buffer area, and the first sub-model is one of the plurality of sub-models and is different from the target sub-model.

An electronic device, including a processor, a memory, and a computer program stored on the memory and capable of running on the processor; where, when the computer program is executed by the processor, the steps of the above method for preventing model penetration are implemented.

A computer-readable storage medium, with a computer program stored thereon; and when the computer program is executed by a processor, the steps of the above method for preventing model penetration are implemented.

BRIEF DESCRIPTION OF THE DRAWINGS

In order to illustrate the technical solutions of the present disclosure more clearly, the accompanying drawings that need to be used in the description of the present disclosure are briefly described below. Obviously, the drawings in the following description are some embodiments of the present disclosure, and for those of ordinary skill in the art, other drawings can also be obtained from these drawings without creative efforts.

DETAILED DESCRIPTION

Figure 1:
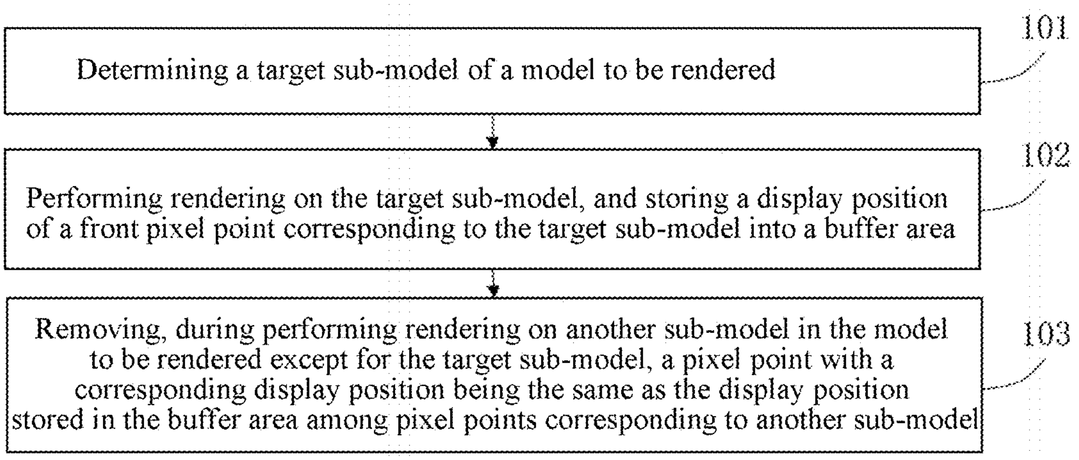
FIG. 1 is a step flowchart of a method for preventing model penetration according to some embodiments of the present disclosure.

In order to make the above objectives, features and advantages of the present disclosure more obvious and comprehensible, the present disclosure will be further described in detail below with reference to the accompanying drawings and specific implementations. Obviously, the described embodiments are part of the embodiments of the present disclosure, rather than all of the embodiments. All other embodiments obtained by those of ordinary skill in the art without creative efforts based on the embodiments of the present disclosure shall fall within the protection scope of the present disclosure.

In 3D games, in order to simulate the dynamic effect of clothing in reality, physical modes such as a cloth system or a rigid body driving skeletons, are usually used to drive the movement of the clothing grid. In the game, there is a strict requirement for the running time of each frame. Usually, for a game of 60 frames, the running time of each frame is 16.6 ms, and the time allocated to the physical simulation is less. In such a short period of time, accurate physical simulation is difficult to achieve. Therefore, it often occurs that the inner-layer clothing penetrates into the outer-layer clothing, and the skin of the character penetrates into the outside of the clothing.

In the related art, there are generally two ways to prevent model penetration. The first manner is to maintain reasonable distances between the clothing and the character body, or between the outer-layer clothing and the inner-layer clothing, by adjusting the physical parameters of the clothing and the character body as well as the outer-layer clothing and the inner-layer clothing. However, in this manner, a large amount of time needs to be spent by art production personnel on adjusting the physical parameters, the efficiency is low, and the clothing looks like being stretched out, which results in unreal overall image of the model and serious physical effect loss.

In a second manner, during the model-making stage, the inner-layer clothing grid and the character body grid that are blocked by the outer-layer clothing are marked; and then the marked inner-layer clothing grid and the character body grid are removed during rendering. According to this processing mode, there are very high requirements for the grid selected to be marked; if the marking range is too small, that is, some grids which should be marked are not marked, the penetration phenomenon may still exist; and if the marking range is too large, that is, some grids which are not blocked by the outer-layer clothing are marked, it may result in a fracture phenomenon of the rendered model.

In view of this, the embodiments of the present disclosure provide a method for preventing model penetration to overcome the defects in the related art.

In some embodiments of the present disclosure, the method for preventing model penetration may be performed on a local terminal device or a server. When the method for preventing model penetration is performed on a server, the method for preventing model penetration may be implemented and executed based on a cloud interaction system, where the cloud interaction system includes a server and a client device.

In some embodiments, various cloud applications may be run in the cloud interaction system, such as a cloud game. Taking a cloud game as an example, the cloud game refers to a game manner based on cloud computing. In the running mode of the cloud game, the running body of the game program and the game screen presentation body are separated; the storage and running of the method for preventing model penetration are completed on the cloud game server, and the role of the client device is to receive and send data, and present the game screen. For example, the client device may be a display device with a data transmission function close to the user side, such as a first terminal device, a television, a computer, a palm computer, or the like. However, it is the cloud game server in the cloud to perform the method for preventing model penetration. When a game is performed, the player operates the client device to send an operation instruction to the cloud game server; the cloud game server runs the game according to the operation instruction, encodes and compresses data such as the game screen, returns the data to the cloud client device through the network, and finally decodes and outputs the game screen through the client device.

In some embodiments, taking a cloud game as an example, the local terminal device stores a game program and is configured to present a game screen. The local terminal device is configured to interact with the player through a graphical user interface, that is, to conventionally download and install the game program through the electronic device and run it. The manner in which the local terminal device provides the graphical user interface to the player may include a variety of manners; for example, it may be rendered and displayed on a display screen of the terminal, or it may be provided to the player through holographic projection. For example, the local terminal device may include a display screen and a processor; the display screen is configured to present a graphical user interface; the graphical user interface includes a game screen; the processor is configured to run the game, generate the graphical user interface, and control the display of the graphical user interface on the display screen.

Referring to FIG. 1, FIG. 1 shows a step flowchart of a method for preventing model penetration according to some embodiments of the present disclosure, which may include the following steps.

In step 101, a target sub-model of a model to be rendered is determined.

In step 102, the target sub-model is rendered, and a display position of a front pixel point corresponding to the target sub-model is stored into a buffer area.

In step 103, during performing rendering on other sub-models in the model to be rendered except for the target sub-model, a pixel point with a corresponding display position being the same as the display position stored in the buffer area among pixel points corresponding to other sub-models is removed.

In the embodiments of the present disclosure, the target sub-model of the model to be rendered is determined; during performing rendering on the target sub-model, the display position of the front pixel point corresponding to the target sub-model is stored into a buffer area; and during performing rendering on other sub-models in the model to be rendered except for the target sub-model, a pixel point with a corresponding display position being the same as the display position stored in the buffer area among pixel points corresponding to other sub-models is removed, so as to ensure that the part blocked by the target sub-model in other sub-models may not be rendered and displayed, thus simply and efficiently solving the problem of model penetration.

The method for preventing model penetration in the present example embodiment is further described below.

In step 101, a target sub-model of a model to be rendered is determined.

In the embodiments of the present disclosure, the model to be rendered may be a character model that needs to be displayed in real time during the running process of the game application, such as a character model in the game.

The model to be rendered is generally formed by combining a plurality of sub-models. Taking a character model as an example, the character model is generally formed by a body model of a person and a clothing model.

Each sub-model has a corresponding layer level. According to the layer level corresponding to each sub-model, the target sub-model corresponding to the target layer level number may be determined. The target layer level number is generally the maximum layer level number, that is, the target sub-model is the outermost sub-model of the model to be rendered. The target layer level number may be an absolute maximum layer level number, or may be a relative maximum layer level number, the two cases of which will be exemplarily explained in the following context. Generally, during the model production stage, the respective layer levels of the plurality of sub-models forming the model to be rendered may be determined by the art production personnel.

In an example, when determining the layer level of each sub-model, the art production personnel may determine the layer level of each sub-model by taking the center line of the model to be rendered as a reference and according to the maximum vertical distance between each sub-model and the center line.

For example, when the model to be rendered is a character model, the center line of which is a straight line where the midline of the character model is located. If the character model is formed by a body model and a clothing model, the vertical distance between the body model forming the character model and the center line is smaller than the vertical distance between the clothing model and the center line. Therefore, the layer level of the body model is at the innermost layer, the clothing model is at the outermost layer; that is, the body model is the first layer, and the clothing model is the second layer. It can be understood that the target sub-model of the model to be rendered is a sub-model with the maximum vertical distance from the center line of the model to be rendered among the plurality of sub-models forming the model to be rendered; that is, the target sub-model is a sub-model with the maximum layer level number among the sub-models forming the model to be rendered.

For example, when the model to be rendered is a character model wearing a waistcoat, a long-sleeved underwear and a skirt, the waistcoat does not overlap the skirt, and the long-sleeved underwear does not overlap the skirt either, the body model of the character in the model to be rendered is the first layer, the long-sleeved underwear model is the second layer, the waistcoat model is the third layer, and the skirt model is the second layer. It can be seen that in the plurality of sub-models of the model to be rendered, the sub-model corresponding to the absolute maximum layer level number is the waistcoat model. Therefore, in the present example, the waistcoat model is the target sub-model; and the long-sleeved underwear model, the skirt model and the body model belong to other sub-models.

When there is a plurality of sub-models with the maximum layer level number, the plurality of sub-models corresponding to the plurality of maximum layer level number are all the target sub-models. For example, when the model to be rendered is a character model wearing a jacket and a skirt, where the jacket does not overlap with the skirt, in the model to be rendered, the body model of the character is the first layer, the jacket model and the skirt model are both the second layers, which are both the maximum layer levels, and the target sub-models are the jacket model and the skirt model.

In some embodiments, the target sub-model is a sub-model with a layer level number of a maximum layer level number among the sub-models corresponding to the coverage area of the target sub-model. That is, the target layer level number corresponding to the target sub-model is the relative maximum layer level number. It may be understood that in the embodiment, it may be determined whether the sub-model is located at the maximum layer level in the coverage area of the sub-model or not, according to the area (i.e. the coverage area) corresponding to each sub-model; and if yes, the sub-model is determined as the target sub-model.

For example, when the model to be rendered is a character model wearing a waistcoat, a long-sleeved underwear and a skirt, where the waistcoat does not overlap with the skirt, and the long-sleeved underwear does not overlap with the skirt either, in the model to be rendered, the body model of the character is the first layer, the long-sleeved underwear model is the second layer, the waistcoat model is the third layer, and the skirt model is the second layer. For the skirt model, the coverage area of skirt model also relates to the body model, and the body model is the first layer, which is smaller than the layer level number of the skirt model; that is, the skirt model is the sub-model with the maximum layer level number in its coverage area; therefore, the skirt model may be determined as the target sub-model. Similarly, for the waistcoat layer level, the coverage area of the waistcoat layer level relates to the body model and the long-sleeved underwear model, where the body model is the first layer, and the long-sleeved underwear model is the second layer, both of which are smaller than the layer level number of the waistcoat model; that is, the waistcoat model is the sub-model with the maximum layer level number in its coverage area; therefore, the waistcoat model may also be determined as the target sub-model. For the long-sleeved underwear model, the coverage area of the long-sleeved underwear model relates to the body model and the waistcoat model; since the layer level number of the long-sleeved underwear model is smaller than the layer level number of the waistcoat model, that is, the long-sleeved underwear model is not the sub-model with the maximum layer level number in its coverage area, the long-sleeved underwear model is not the target sub-model. That is, in this example, the target sub-model includes the skirt model and the waistcoat model, and the long-sleeved underwear model and the body model belong to other sub-models.

In step 102, the target sub-model is rendered, and a display position of a front pixel point corresponding to the target sub-model is stored into a buffer area.

In the embodiments of the present disclosure, when performing rendering on the model to be rendered, the target sub-model is rendered firstly; and when the target sub-model is rendered, a display position of a front pixel point corresponding to the target sub-model is stored into a buffer area. Among them, the front pixel point refers to a pixel point corresponding to a front surface of the target sub-model; and the front surface generally refers to a surface of the target sub-model that can be directly seen visually when the model to be rendered is normally displayed. In some embodiments, determining whether a surface is a front surface or not, is related to standards set during production of the model according to art. For example, when the model is produced according to art, if points in a polygon (i.e., a surface) appear in a clockwise order, the surface may be set as a front surface; therefore, when points in a surface appear in a clockwise order, the surface is the front surface.

The display position of the front pixel point corresponding to the target sub-model is stored into the buffer area, and is used as a reference for subsequent rendering of other sub-models, preventing the phenomenon that the target sub-model is penetrated due to the fact that the pixel points corresponding to the other sub-models are displayed at the display positions stored in the buffer area.

In some embodiments of the present disclosure, performing rendering on the target sub-model, and storing the display position of the front pixel point corresponding to the target sub-model into the buffer area, includes:

performing back removal rendering on the target sub-model, and storing the display position of the front pixel point corresponding to the target sub-model into the buffer area.

In the embodiments, the back removal rendering refers to, during rendering, removing the back surface of the target sub-model without rendering, and only rendering the front surface of the target sub-model, so as to reduce the number of surfaces to be rendered, thus improving the rendering efficiency. Among them, the back surface generally refers to a surface of the target sub-model that cannot be directly seen visually when the model to be rendered is normally displayed. In some embodiments, determining whether a surface is a back surface or not, is related to rules set during production of the model according to art. For example, when producing the model according to art, if points in a polygon (i.e., a surface) appear in a clockwise order, the surface may be set as a front surface. Therefore, when points in a surface appear in a clockwise order, the surface is a front surface; correspondingly, when points in a surface appear in a counterclockwise order, the surface is the back surface.

Furthermore, in some embodiments of the present disclosure, when the target sub-model represents clothing, performing rendering on the target sub-model, and storing the display position of the front pixel point corresponding to the target sub-model into the buffer area, includes:

when the target sub-model is formed by an outer-layer grid and an inner-layer grid, performing back removal rendering on the outer-layer grid, and storing a display position of a front pixel point corresponding to the outer-layer grid into the buffer area; and performing rendering on the inner-layer grid.

When there is a need to view the interior of the clothing, when producing the model that represents the clothing, the art production personnel may use two layers (an inner layer and an outer layer) of grids with the same shape, there is a certain thickness between the two layers of grids, and there is no overlapping and interleaving situation, so that the interior of the clothing may be displayed in a scenario where it is necessary to see the interior of the clothing.

In the embodiments of the present disclosure, when performing rendering on the target sub-model formed by an outer-layer grid and an inner-layer grid, back removal rendering may be performed on the outer-layer grid firstly, so as to reduce the number of surfaces to be rendered; and for the inner-layer grid, direct rendering may be performed, so as to avoid that the inner-layer grid is not rendered due to back-removal rendering when the inner-layer grid needs to be displayed.

In step 103, during performing rendering on other sub-models in the model to be rendered except for the target sub-model, a pixel point with a corresponding display position being the same as the display position stored in the buffer area among pixel points corresponding to other sub-models is removed.

And after rendering of the target sub-model is completed, rendering of other sub-models in the model to be rendered except for the target sub-model is performed. During performing rendering on other sub-models, the pixel point with a corresponding display position being the same as the display position stored in the buffer area among pixel points corresponding to other sub-models is removed, so that only the target sub-model is displayed in the display area for displaying target sub-model, and the phenomenon that other sub-models penetrates into the target sub-model can be prevented.

In a specific implementation, during performing rendering on other sub-models, the display position of each pixel point corresponding to other sub-models can be compared with the display position in the buffer area. When the display position of the pixel point corresponding to other sub-models is different from any display position stored in the buffer area, rendering and writing are performed. When the display position of the pixel point corresponding to other sub-models is the same as one of the display positions stored in the buffer area, rendering and writing are not performed; that is, the pixel point with a corresponding display position being the same as the display position stored in the buffer area among pixel points corresponding to other sub-models is removed.

In some embodiments of the present disclosure, other sub-models may be divided into a first model part and a second model part, where the display positions of the pixel points corresponding to the first model part are always different from the display positions stored in the buffer area. Removing, during performing rendering on other sub-models in the model to be rendered except for the target sub-model, a pixel point with a corresponding display position being the same as a display position stored in the buffer area among pixel points corresponding to other sub-models, may include:

removing, during performing rendering on the second model part, a pixel point with a corresponding display position being the same as the display position stored in the buffer area among pixel points corresponding to the second model part; and performing, after rendering of the second model part is completed, rendering on the first model part.

In the embodiment, the other sub-model may be divided into the first model part and the second model part by art production personnel according to experiences, ensuring that the display positions of the pixel points corresponding to the first model part are always different from the display position stored in the buffer area. For example, when the model to be rendered corresponds to a character model wearing a dress, the target sub-model of the model to be rendered is a dress model, and the other sub-model is a body model of the character. Considering that the head of the character may never be blocked by the dress, thus, the body model may be divided into the head part and the other part. The head part is the first model part, and the other part is the second model part. Certainly, it can also be considered that the hands and the feet of the character may also never be blocked by the dress, thus, the body model can be divided into the head part, the hands, the feet and the remaining other part. The head part, the hands and the feet form the first model part, and the remaining other part is the second model part.

Since the display position of the pixel point corresponding to the first model part is always different from the display position stored in the buffer area, the first model part may be directly rendered, so as to reduce the number of pixel points needing to be compared, and improve the rendering efficiency.

According to the embodiment, during performing rendering on the second model part, whether the display position of the pixel point corresponding to the second model part is the same as the display position stored in the buffer area or not is compared; and if yes, the pixel point is removed; therefore, in the embodiment, the division of the first model part and the second model part does not need to be very accurate, which may reduce the difficulty of division by the art production personnel. In the example of the character model with the dress, the first model part may only include the head part of the body model of the character, or may be formed by the head part, the hands and the feet of the body model of the character. It can be seen that the division does not need to be very accurate.

In some embodiments of the present disclosure, when the model to be rendered is formed by more than three sub-models, that is, when the other sub-models include more than two sub-models, removing, during performing rendering on other sub-models in the model to be rendered except for the target sub-model, a pixel point with a corresponding display position being the same as a display position stored in the buffer area among pixel points corresponding to other sub-models, may further include:

performing rendering sequentially according to an order of layer levels of the more than two sub-models from large to small.

In the embodiment, for the model to be rendered formed by a plurality of sub-models, rendering may be sequentially performed according to the order of layer levels of the sub-models from large to small.

For example, when the model to be rendered corresponds to a character model wearing a dress and a waistcoat outside the dress, the first layer level is a body model of the character, the second layer level is a dress model, and the third layer level is a waistcoat model. Thus, the target sub-model of the model to be rendered is the waistcoat model, the other sub-models are the dress model and the body model of the character, and the layer level of the dress model is greater than the layer level of the body model. At this time, after rendering of the waistcoat model is completed, rendering of the dress model may be started. When performing rendering on the dress model, whether the display position of the pixel point corresponding to the dress model is the same as the display position stored in the buffer area or not, is compared; and if yes, the pixel point corresponding to the dress model is removed. After rendering of the dress model is completed, rendering of the body model is then performed. When performing rendering on the body model, whether the display position of the pixel point corresponding to the body model is the same as the display position stored in the buffer area or not, is compared; and if yes, the pixel point corresponding to the body model is removed. It can be ensured that the waistcoat model at the outermost layer cannot be penetrated by the inner layer model.

Furthermore, performing rendering sequentially according to an order of layer levels of the more than two sub-models from large to small, may further include:

storing, when rendering of a sub-model at a current layer level is completed, a display position of a non-removed pixel point corresponding to the sub-model at the current layer level into the buffer area.

Among them, the sub-model at the current layer level may be a sub-model at any layer level. During rendering of the sub-model at the current layer level, the display position of the pixel point corresponding to the sub-model at the current layer level is compared with the display position stored in the buffer area; if they are the same, the pixel point corresponding to the sub-model at the current layer level is removed; and if they are different, the different display position is added into the buffer area. Therefore, during rendering of the sub-model at a next layer level (i.e., the sub-model with a layer level number smaller than the layer level number of the sub-model at the current layer level), it may be determined whether the display position of the pixel point corresponding to the sub-model at the next layer level coincides with the display position of the corresponding pixel point of the sub-model at the layer level that has been previously rendered or not, and the coincident pixel points are removed, so as to prevent the sub-model at a next layer level from penetrating into the previously rendered sub-model.

Continuing to take the character model wearing a dress and a waistcoat outside the dress as an example, the rendering process of the waistcoat model and the dress model is consistent with that described above, and details are not described here again. When rendering of the dress model is completed, the display position of the corresponding pixel point of the dress model is added into the buffer area. At this time, the buffer area stores with the display area of the waistcoat and the display area of the dress not overlapped with the waistcoat. Then, the body model is rendered, and the pixel point with a display position falling within the display area of the waistcoat and display area of the dress not overlapped with the waistcoat among the pixel points corresponding to the body model, is removed, preventing the body model from penetrating outside the dress model or the waistcoat model.

In some embodiments, when sequentially performing rendering according to an order of the layer levels of more than two sub-models from large to small, the sub-model at the current layer level may also be divided into a model outer-part and a model inner-part, where the model outer-part and the model inner-part are relative to the previously rendered sub-model. That is, the sub-model at the current layer level may be divided into a model outer-part which may never be blocked by the rendered sub-model and a model inner-part. In the specific implementation, it may be divided and marked by the art production personnel according to experiences. When the model outer-part of the sub-model at the current layer level is rendered, it may be directly rendered; and when the rendering is completed, the display position of the pixel point corresponding to the model outer-part is stored in the buffer area. When the model inner-part of the sub-model at the current layer level is rendered, the process of comparing with the display position in the buffer area needs to be performed. When rendering of the model inner-part is completed, the display position of the pixel point of the model inner-part which is not removed, is stored in the buffer area.

Furthermore, in some embodiments of the present disclosure, removing, during performing rendering on other sub-models in the model to be rendered except for the target sub-model, a pixel point with a corresponding display position being the same as a display position stored in the buffer area among pixel points corresponding to other sub-models, may further include:

performing back removal rendering on other sub-models.

In the embodiment, when performing rendering on other sub-models, the back-removal rendering may be selected to reduce the number of surfaces to be rendered and improve the rendering efficiency.

According to the method for preventing model penetration provided by the embodiments of the present disclosure, the penetration part is corrected from the rendering aspect, solving the problem of model penetration caused by inaccurate physical simulation. Compared with the first manner of adjusting physical parameters by the art production personnel in the related art, in the embodiments of the present disclosure, there is no need to change physical parameters in order to eliminate penetration, thus retaining a better dynamic effect of cloth. Furthermore, a large amount of time for parameter adjustment by the art production personnel can be saved. In addition, compared with the second manner of directly cutting off the model part that is possible to be penetrated, during rendering in the embodiments of the present disclosure, removal of penetration is performed by using a manner of pixel-by-pixel, which is more accurate, and may not result in a goof phenomenon when a cut-off part needs to be displayed. Furthermore, in the embodiments of the present disclosure, the model rendering efficiency may be further improved through an operation in which there is no need to accurately mark a removal part, which does not bring great workload to the art production personnel. According to the embodiments of the present disclosure, the penetration problem may be correctly processed on the premise of ensuring the physical effect of the clothing, the art workload is reduced, and the model rendering efficiency is improved.

In order to facilitate those skilled in the art to understand the present solution, the method for preventing model penetration provided in the embodiments of the present disclosure will be described below with reference to specific examples.

Figure 2:
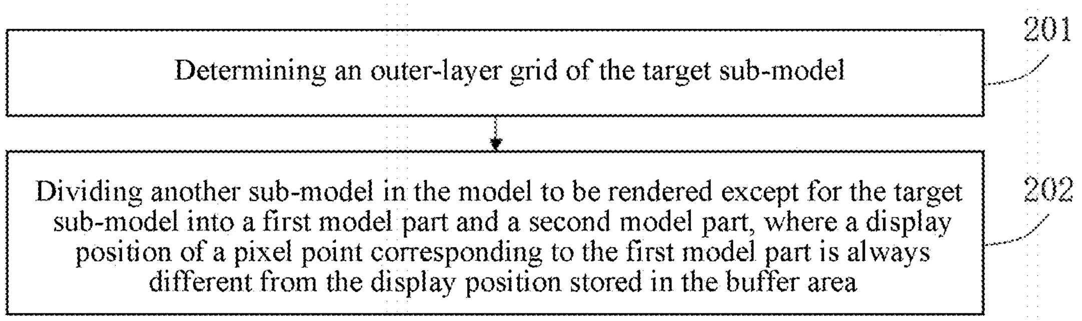
FIG. 2 is a step flowchart of a first processing stage in a method for preventing model penetration according to some embodiments of the present disclosure.

In the example, the model to be rendered corresponds to a character model wearing a dress. The implementation process of the method for preventing model penetration may include two processing stages; the first processing stage is an offline processing stage, and the second processing stage is a running stage. As shown in FIG. 2, the first processing stage may include the following step.

In step 201, an outer grid of the target sub-model is determined.

The target sub-model in the example is a dress model. When the dress model is formed by an inner-layer grid and an outer-layer grid, the outer-layer grid of the dress model needs to be determined, and the outer-layer grid of the dress model needs to be stored as a separate material group. When the dress model is only formed by one layer of grid, the grid of the dress model is the outer-layer grid, which is stored as a separate material group.

In step 202, the other sub-model in the model to be rendered except for the target sub-model is divided into a first model part and a second model part, where the display position of the pixel point corresponding to the first model part is always different from the display position stored in the buffer area.

In the example, the other sub-model is the body model, and the body model may be divided into a first model part including a head part, hands and feet, and a remaining second model part by the art production personnel according to experiences, so as to improve the operation efficiency in subsequent running processes.

Figure 3:
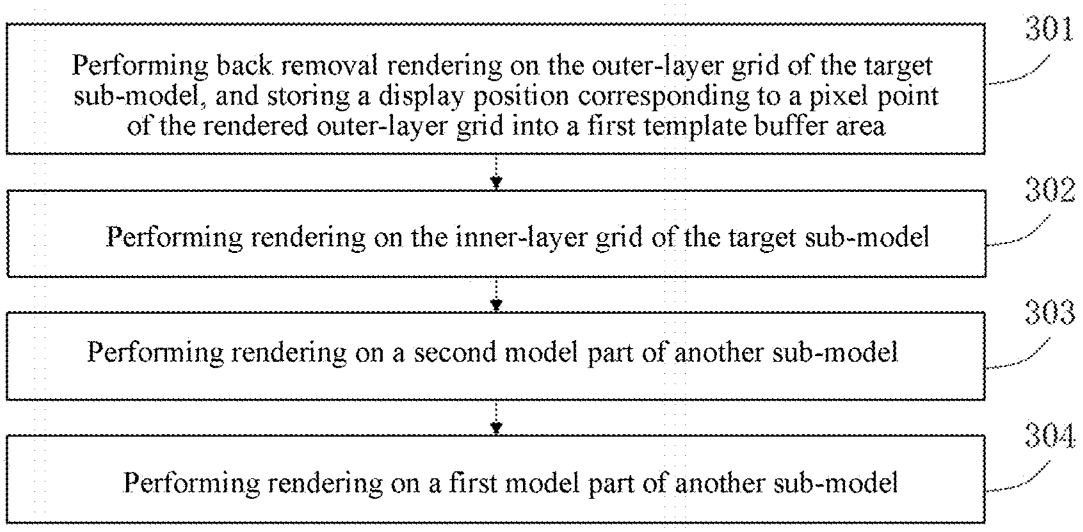
FIG. 3 is a step flowchart of a second processing stage in a method for preventing model penetration according to some embodiments of the present disclosure.

As shown in FIG. 3, the second processing stage of the example may include the following steps.

In step 301, back removal rendering is performed on the outer-layer grid of the target sub-model, and the display position corresponding to the pixel point of the rendered outer-layer grid is stored into a first template buffer area.

In the example, a template test is turned on prior to the start of rendering. The template test is a sample by sample operation performed after fragment shader and provided by a 3D graphics pipeline. In the template test, stencil function (a template function) is set to Always passes, stencil Ref (a template reference value) is set to 0x48 (0x48 here is merely an example, which may be any value between 0x01 to 0xff); stencil operation (a template operation value) is set to Replace. After the template test setting is completed, rendering after back removal is performed on the outer-layer grid is performed then. After rendering of the outer-layer grid is completed, the display position of the pixel point corresponding to the outer-layer grid is stored into the 0x48 of the template buffer area.

In step 302, rendering is performed on the inner-layer grid of the target sub-model.

When the target sub-model includes an inner-layer grid, after rendering of the outer-layer grid of the target sub-model is completed, stencil Ref is modified to be 0x16 (0x16 here is merely an example, and may be any value other than 0x48 between 0x01 to 0xff); and then, rendering is performed on the inner-layer grid. After the rendering of the inner-layer grid is completed, the display position of the pixel point corresponding to the inner-layer grid may be stored in 0x16 of the template buffer area.

In step 303, rendering is performed on a second model part of the other sub-model.

In the example, after the rendering of the target sub-model is completed, stencil function needs to be set to Not Equal, stencil Ref is set to 0x48 (which needs to be consistent with the stencil Ref set in step 301), and then rendering is performed on the second model part of the other sub-model. When rendering is performed on the second model part, the second model part may be compared with the display position in the template buffer area. In some embodiments, a value corresponding to the display position is stored in the template buffer area; during comparison, if the value of the display position of the corresponding pixel is equal to the value stored in the template buffer area, the pixel with the same value is removed; and if the value of the display position of the corresponding pixel is not equal to the value stored in the template buffer area, rendering may be performed, and the value of the display position of the pixel is added into the template buffer area.

In step 304, rendering is performed on a first model part of the other sub-model.

Since the first model part is a part that is never blocked by the outer-layer sub-model, before rendering of the first model part, the template test may be turned off. That is, the first model part is directly rendered, and no special processing is required.

In the example, at the offline stage, the outer-layer grid of the target sub-model of the model to be rendered may be separated out, and the other sub-model in the model to be rendered except for the target sub-model may be divided into the first model par that is never blocked by the target sub-model and the remaining second model part. At the running stage, the value of the display position of the pixel point corresponding to the outer-layer grid is stored into a specified template buffer area according to that the outer-layer grid of the target sub-model is rendered firstly, and then rendering is performed on the second model part of the other sub-model; when rendering is performed on the second model part, the pixel with the same value of display position as the value stored in the template buffer area among the pixel points corresponding to the second model part is removed, and finally rendering is performed the first model part of the other sub-model. Alternatively, at the running stage, the first model part of the other sub-model may also be rendered firstly, then the template test is turned on, rendering is performed on the outer-layer grid of the target sub-model, the value of real position of the pixel point corresponding to the outer-layer grid is stored in the specified template buffer area, and finally rendering is performed on the second model part of the other sub-model. When rendering is performed on the second model part, the pixel with the same value of display position as the value stored in the template buffer area among the pixel points corresponding to the second model part is removed. It may effectively prevent model penetration, and compared with the processing manner in the related art, the efficiency is higher, and the effect is better.

It should be noted that, for the method embodiments, for simplicity of description, they are all expressed as series of action combinations; however, those skilled in the art should understand that the embodiments of the present disclosure are not limited by the described action sequence, because some steps may be performed in other sequences or simultaneously according to the embodiments of the present disclosure. Secondly, those skilled in the art should also understand that the embodiments described in the specification are all preferred embodiments, and the involved actions are not necessarily required by the embodiments of the present disclosure.

Figure 4:
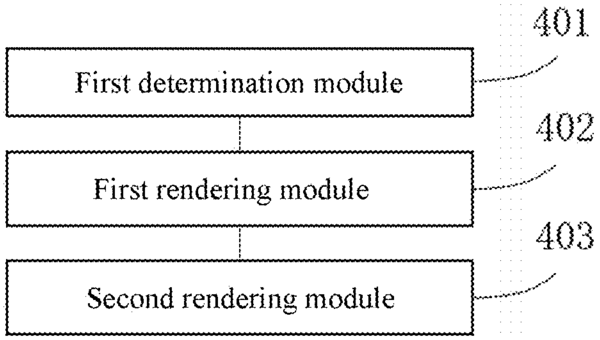
FIG. 4 is a structural block diagram of an apparatus for preventing model penetration according to some embodiments of the present disclosure.

Referring to FIG. 4, FIG. 4 shows a structural block diagram of an apparatus for preventing model penetration according to some embodiments of the present disclosure. In the embodiment of the present disclosure, the apparatus for preventing model penetration may include a first determination module 401, a first rendering module 402 and a second rendering module 403.

The first determination module 401 is configured to determine a target sub-model of a model to be rendered, where the target sub-model is a sub-model with a layer level number of a target layer level number among a plurality of sub-models that forms the model to be rendered.

The first rendering module 402 is configured to perform rendering on the target sub-model, and store a display position of a front pixel point corresponding to the target sub-model into a buffer area.

The second rendering module 403 is configured to remove a pixel point with a corresponding display position being the same as the display position stored in the buffer area among pixel points corresponding to another sub-model, during performing rendering on the other sub-model in the model to be rendered except for the target sub-model.

In some embodiments of the present disclosure, the target sub-model is a sub-model with a layer level number of a maximum layer level number among sub-models corresponding to a coverage area of the target sub-model.

In some embodiments of the present disclosure, the first rendering module 402 includes:

a first back removal rendering module, configured to perform back removal rendering on the target sub-model, and store the display position of the front pixel point corresponding to the target sub-model into the buffer area.

In some embodiments of the present disclosure, the first rendering module 402 includes:

an outer-layer rendering module, configured to perform, when the target sub-model is formed by an outer-layer grid and an inner-layer grid, back removal rendering on the outer-layer grid, and store a display position of a front pixel point corresponding to the outer-layer grid into the buffer area; and an inner-layer rendering module, configured to perform rendering on the inner-layer grid.

In some embodiments of the present disclosure, the second rendering module 403 includes:

a sequential rendering module, configured to perform, when the other sub-model is formed by more than two sub-models, rendering sequentially according to an order of layer levels of the more than two sub-models from large to small.

In some embodiments of the present disclosure, the sequential rendering module is configured to store, when rendering of the sub-model at a current layer level is completed, a display position of a non-removed pixel point corresponding to the sub-model at the current layer level into the buffer area.

In some embodiments of the present disclosure, the other sub-model is formed by a first model part and a second model part, where a display position of a pixel point corresponding to the first model part is always different from the display position stored in the buffer area. The second rendering module 403 includes:

a second model part rendering module, configured to remove, during performing rendering on the second model part, a pixel point with a corresponding display position being the same as the display position stored in the buffer area among pixel points corresponding to the second model part; and a first model part rendering module, configured to perform rendering on the first model part after rendering of the second model part is completed.

In some embodiments of the present disclosure, the second rendering module 403 further includes:

a second back-removing rendering module, configured to perform back removal rendering on the other sub-model.

In the embodiments of the present disclosure, the target sub-model of the model to be rendered is determined through the first determination module 401; when rendering is performed on the target sub-model through the first rendering module 402, the display position of the front pixel point corresponding to the target sub-model is stored into the buffer area; and when rendering is performed on other sub-models in the model to be rendered except for the target sub-model through the second rendering module 403, the pixel point with a corresponding display position being the same as the display position stored in the buffer area among pixel points corresponding to other sub-models, is removed. Therefore, it is ensured that the part of other sub-models blocked by the target sub-model may not be rendered and displayed, thus simply and efficiently solving the problem of model penetration.

For the apparatus embodiments, since they are basically similar to the method embodiments, the description is relatively simple, and the relevant part may refer to the part of description of the method embodiments.

Figure 5:
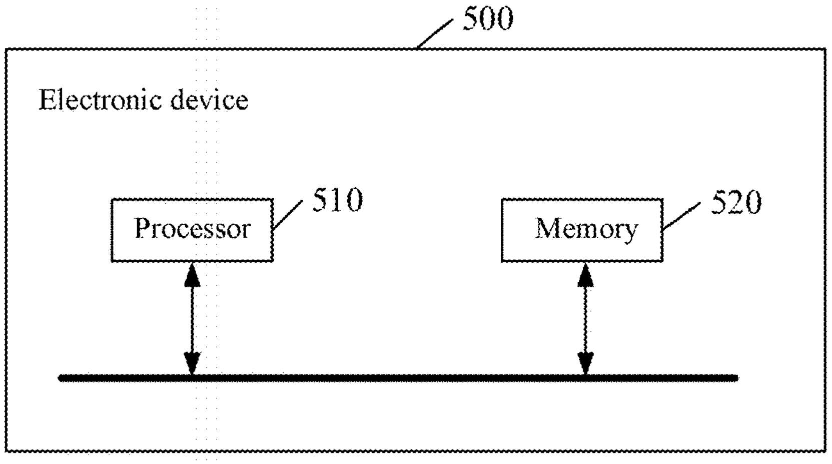
FIG. 5 is a block diagram of an electronic device according to some embodiments of the present disclosure.

According to some embodiments of the present disclosure, there is further provided an electronic device. As shown in FIG. 5, the electronic device 500 includes a processor 510, a memory 520, and a computer program stored on the memory 520 and capable of running on the processor 510. When the computer program is executed by the processor 510, the steps of the method for preventing model penetration as described above are implemented.

In some embodiments, when the computer program is executed by the processor, the following steps may be implemented: determining a target sub-model of the model to be rendered, where the target sub-model is a sub-model with a layer level number of a target layer level number among a plurality of sub-models that form the model to be rendered; performing rendering on the target sub-model, and storing a display position of a front pixel point corresponding to the target sub-model into a buffer area; and removing, during performing rendering on another sub-model in the model to be rendered except for the target sub-model, a pixel point with a corresponding display position being the same as the display position stored in the buffer area among pixel points corresponding to another sub-model.

In some embodiments of the present disclosure, the step of performing rendering on the target sub-model, and storing a display position of a front pixel point corresponding to the target sub-model into a buffer area, includes: performing back removal rendering on the target sub-model, and storing the display position of the front pixel point corresponding to the target sub-model into the buffer area.

In some embodiments of the present disclosure, the step of performing rendering on the target sub-model, and storing a display position of a front pixel point corresponding to the target sub-model into a buffer area further includes: performing, when the target sub-model is formed by an outer-layer grid and an inner-layer grid, back removal rendering on the outer-layer grid, and storing a display position of a front pixel point corresponding to the outer-layer grid into the buffer area; and performing rendering on the inner-layer grid.

In some embodiments of the present disclosure, the step of removing, during performing rendering on another sub-model in the model to be rendered except for the target sub-model, a pixel point with a corresponding display position being the same as a display position stored in the buffer area among pixel points corresponding to another sub-model, further includes: performing, when another sub-model is formed by more than two sub-models, rendering sequentially according to an order of layer levels of the more than two sub-models from large to small.

In some embodiments of the present disclosure, the step of performing rendering sequentially according to an order of layer levels of more than two sub-models from large to small, further includes: storing, when rendering of a sub-model at a current layer level is completed, a display position of a non-removed pixel point corresponding to the sub-model at the current layer level into the buffer area.

In some embodiments of the present disclosure, another sub-model is formed by a first model part and a second model part, where a display position of a pixel point corresponding to the first model part is always different from the display position stored in the buffer area; the step of removing, during performing rendering on another sub-model in the model to be rendered except for the target sub-model, a pixel point with a corresponding display position being the same as a display position stored in the buffer area among pixel points corresponding to another sub-model, includes: removing, during performing rendering on the second model part, a pixel point with a corresponding display position being the same as the display position stored in the buffer area among pixel points corresponding to the second model part; and performing rendering on the first model part after rendering of the second model part is completed.

In some embodiments of the present disclosure, the step removing, during performing rendering on another sub-model in the model to be rendered except for the target sub-model, a pixel point with a corresponding display position being the same as the display position stored in the buffer area among pixel points corresponding to another sub-model, further includes: performing back removal rendering on another sub-model.

In some embodiments of the present disclosure, the target sub-model is a sub-model with a layer level number of a maximum layer level number among sub-models corresponding to a coverage area of the target sub-model.

In the above embodiments, the target sub-model of the model to be rendered is determined; during performing rendering on the target sub-model, the display position of the front pixel point corresponding to the target sub-model is stored into a buffer area; and during performing rendering on other sub-models in the model to be rendered except for the target sub-model, a pixel point with a corresponding display position being the same as the display position stored in the buffer area among pixel points corresponding to other sub-models is removed, so as to ensure that the part blocked by the target sub-model in other sub-models may not be rendered and displayed, thus simply and efficiently solving the problem of model penetration.

According to some embodiments of the present disclosure, there is further provided a non-transitory computer-readable storage medium, where the non-transitory computer-readable storage medium stores a computer program, and when the computer program is executed by a processor, the steps of the method for preventing model penetration as described above are implemented.

In some embodiments, when the computer program stored on the computer-readable storage medium is executed by the processor, the following steps may be implemented: determining a target sub-model of the model to be rendered, where the target sub-model is a sub-model with a layer level number of a target layer level number among a plurality of sub-models that form the model to be rendered; performing rendering on the target sub-model, and storing a display position of a front pixel point corresponding to the target sub-model into a buffer area; and removing, during performing rendering on another sub-model in the model to be rendered except for the target sub-model, a pixel point with a corresponding display position being the same as the display position stored in the buffer area among pixel points corresponding to another sub-model.

In some embodiments of the present disclosure, the step of performing rendering on the target sub-model, and storing a display position of a front pixel point corresponding to the target sub-model into a buffer area, includes: performing back removal rendering on the target sub-model, and storing the display position of the front pixel point corresponding to the target sub-model into the buffer area.

In some embodiments of the present disclosure, the step of performing rendering on the target sub-model, and storing a display position of a front pixel point corresponding to the target sub-model into a buffer area further includes: performing, when the target sub-model is formed by an outer-layer grid and an inner-layer grid, back removal rendering on the outer-layer grid, and storing a display position of a front pixel point corresponding to the outer-layer grid into the buffer area; and performing rendering on the inner-layer grid.

In some embodiments of the present disclosure, the step of removing, during performing rendering on another sub-model in the model to be rendered except for the target sub-model, a pixel point with a corresponding display position being the same as a display position stored in the buffer area among pixel points corresponding to another sub-model, further includes: performing, when another sub-model is formed by more than two sub-models, rendering sequentially according to an order of layer levels of the more than two sub-models from large to small.

In some embodiments of the present disclosure, the step of performing rendering sequentially according to an order of layer levels of more than two sub-models from large to small, further includes: storing, when rendering of a sub-model at a current layer level is completed, a display position of a non-removed pixel point corresponding to the sub-model at the current layer level into the buffer area.

In some embodiments of the present disclosure, another sub-model is formed by a first model part and a second model part, where a display position of a pixel point corresponding to the first model part is always different from the display position stored in the buffer area; the step of removing, during performing rendering on another sub-model in the model to be rendered except for the target sub-model, a pixel point with a corresponding display position being the same as a display position stored in the buffer area among pixel points corresponding to another sub-model, includes: removing, during performing rendering on the second model part, a pixel point with a corresponding display position being the same as the display position stored in the buffer area among pixel points corresponding to the second model part; and performing rendering on the first model part after rendering of the second model part is completed.

In some embodiments of the present disclosure, the step removing, during performing rendering on another sub-model in the model to be rendered except for the target sub-model, a pixel point with a corresponding display position being the same as the display position stored in the buffer area among pixel points corresponding to another sub-model, further includes: performing back removal rendering on another sub-model.

In some embodiments of the present disclosure, the target sub-model is a sub-model with a layer level number of a maximum layer level number among sub-models corresponding to a coverage area of the target sub-model.

In the above embodiments, the target sub-model of the model to be rendered is determined; during performing rendering on the target sub-model, the display position of the front pixel point corresponding to the target sub-model is stored into a buffer area; and during performing rendering on other sub-models in the model to be rendered except for the target sub-model, a pixel point with a corresponding display position being the same as the display position stored in the buffer area among pixel points corresponding to other sub-models is removed, so as to ensure that the part blocked by the target sub-model in other sub-models may not be rendered and displayed, thus simply and efficiently solving the problem of model penetration.

Various embodiments in the present specification are described in a progressive manner, each embodiment focuses on the difference from other embodiments, and the same or similar parts between the various embodiments may refer to each other.

Those skilled in the art should understand that the embodiments of the present disclosure may be provided as a method, an apparatus, or a computer program product. Therefore, embodiments of the present disclosure may be in the form of an entire hardware embodiment, an entire software embodiment, or some embodiments combining software and hardware. Moreover, embodiments of the present disclosure may take the form of a computer program product implemented on one or more computer-usable storage mediums (including but not limited to a disk memory, a CD-ROM, an optical memory, etc.) including computer-usable program code.

Embodiments of the present disclosure are described with reference to flowcharts and/or block diagrams of methods, terminal devices (systems), and computer program products according to embodiments of the present disclosure. It should be understood that, each flow and/or block in the flowcharts and/or block diagrams, and combinations of flows and/or blocks in the flowcharts and/or block diagrams, can be implemented by computer program instructions. These computer program instructions may be provided to a processor of a general purpose computer, a dedicated computer, an embedded processor, or other programmable data processing terminal device to generate a machine such that the instructions executed by the processor of the computer or other programmable data processing terminal device produce means for implementing the functions specified in one or more flows in the flowcharts and/or one or more blocks in the block diagrams.

These computer program instructions may also be stored in a computer-readable memory that can direct a computer or other programmable data processing terminal device to operate in a particular manner such that the instructions stored in the computer-readable memory produce a product that includes an instruction apparatus. The instruction apparatus implements the functions specified in one or more flows in the flowcharts and/or one or more blocks in the block diagrams.

These computer program instructions may also be loaded onto a computer or other programmable data processing terminal device such that a series of operation steps are performed on the computer or other programmable terminal device to produce a computer-implemented process, such that the instructions executed on the computer or other programmable terminal device provide steps for implementing the functions specified in one or more flows in the flowcharts and/or one or more blocks in the block diagrams.

Although the preferred embodiments of the embodiments of the present disclosure have been described, those skilled in the art may make additional changes and modifications to these embodiments once they know the basic inventive concept. Therefore, the appended claims are intended to be interpreted as including the preferred embodiments and all changes and modifications falling within the scope of the embodiments of the present disclosure.

Finally, it should also be noted that, in this context, relational terms, such as first and second, are merely used to distinguish one entity or operation from another entity or operation, without necessarily requiring or implying any such actual relationship or order between these entities or operations. Moreover, the terms “comprising” “including” or any other variant of them are intended to cover a non-exclusive inclusion, such that a process, method, article, or terminal device that includes a series of elements includes not only those elements, but also other elements not explicitly listed, or elements inherent to such a process, method, article, or terminal device. In the absence of more restrictions, the element defined by using the statement of “including a . . . ” does not exclude the presence of additional identical elements in the process, method, article, or terminal device that includes the element.

A method and apparatus for preventing model penetration, an electronic device and a storage medium provided according to the present disclosure are described above in detail. The principles and embodiments of the present disclosure are described here with specific examples, and the description of the above embodiments is merely used to help understand the method of the present disclosure and the core concept of the present disclosure. Meanwhile, for an ordinary skilled in the art, according to the concept of the present disclosure, changes may be made both on specific implementations and application ranges. In summary, the content of the present specification should not be construed as a limitation to the present disclosure.

What is claimed is:

1. A method for rendering a 3D model in a 3D game, performed by an electronic device, comprising:

determining, by a processor of the electronic device, a target sub-model of a model to be rendered, wherein the model to be rendered is to be displayed on a graphical user interface provided by the electronic device during running of the 3D game, the model to be rendered comprises a plurality of sub-models, each of the plurality of sub-models comprises a layer level, the target sub-model is one of the plurality of sub-models, and a layer level number of the target sub-model is a target layer level number;

performing, by the processor, rendering on the target sub-model, and storing a display position of a front pixel point corresponding to the target sub-model into a buffer area in a memory of the electronic device; and removing by the processor, during performing rendering on a first sub-model in the model to be rendered, a pixel point of the first sub-model, wherein the pixel point of the first sub-model is one of pixel points corresponding to the first sub-model, a display position corresponding to the pixel point of the first sub-model is the same as the display position stored in the buffer area, and the first sub-model is one of the plurality of sub-models and is different from the target sub-model.

2. The method according to claim 1, wherein performing rendering on the target sub-model, and storing the display position of the front pixel point corresponding to the target sub-model into the buffer area, comprises:

performing back removal rendering on the target sub-model, and storing the display position of the front pixel point corresponding to the target sub-model into the buffer area.

3. The method according to claim 1, wherein the target sub-model comprises an outer-layer grid and an inner-layer grid, and performing rendering on the target sub-model, and storing the display position of the front pixel point corresponding to the target sub-model into the buffer area, comprises:

performing back removal rendering on the outer-layer grid, and storing a display position of a front pixel point corresponding to the outer-layer grid into the buffer area; and performing rendering on the inner-layer grid.

4. The method according to claim 1, wherein the first sub-model comprises more than two sub-models, and removing, during performing rendering on the first sub-model in the model to be rendered, the pixel point of the first sub-model, further comprises:

performing rendering sequentially according to an order of layer levels of the more than two sub-models from large to small.

5. The method according to claim 4, wherein performing rendering sequentially according to the order of layer levels of the more than two sub-models from large to small, further comprises:

storing, in response to determining that rendering of a sub-model at a current layer level is completed, a display position of a non-removed pixel point corresponding to the sub-model at the current layer level into the buffer area.

6. The method according to claim 1, wherein the first sub-model comprises a first model part and a second model part, and a display position of a pixel point corresponding to the first model part is always different from the display position stored in the buffer area; and removing, during performing rendering on the first sub-model in the model to be rendered, the pixel point of the first sub-model, comprises:

removing, during performing rendering on the second model part, a pixel point of the second model part, wherein the pixel point of the second model part is one of pixel points corresponding to the second model part, and a display position corresponding to the pixel point of the second model part is the same as the display position stored in the buffer area; and performing rendering on the first model part after rendering of the second model part is completed.

7. The method according to claim 1, wherein removing, during performing rendering on the first sub-model in the model to be rendered, the pixel point of the first sub-model, further comprises:

performing back removal rendering on the first sub-model.

8. The method according to claim 1, wherein the target sub-model is one of sub-models corresponding to a coverage area of the target sub-model, and the layer level number of the target sub-model is a maximum layer level number.

9. The method according to claim 1, wherein a layer level of a sub-model is determined by taking a center line of the model to be rendered as a reference and according to a maximum vertical distance between the sub-model and the center line.

10. The method according to claim 1, wherein the front pixel point comprises a pixel point corresponding to a front surface of the target sub-model, and the front surface comprises a surface of the target sub-model that is directly seen visually during normal display of the target sub-model.

11. The method according to claim 1, wherein the target sub-model comprises an outer-layer grid and an inner-layer grid, and the method further comprises:

dividing the first sub-model in the model to be rendered into a first model part and a second model part, wherein a display position of a pixel point corresponding to the first model part is different from the display position stored in the buffer area.

12. The method according to claim 11, wherein determining a target sub-model of a model to be rendered comprises:

determining the outer-layer grid of the target sub-model.

13. The method according to claim 12, further comprises:

storing the outer-layer grid as a separate material group.

14. The method according to claim 11, wherein performing rendering on the target sub-model comprises:

performing back removal rendering on the outer-layer grid of the target sub-model; and performing rendering on the inner-layer grid of the target sub-model.

15. The method according to claim 14, wherein performing rendering on a first sub-model in the model to be rendered comprises:

performing rendering on the second model part of the first sub-model; and performing rendering on the first model part of the first sub-model.

16. An electronic device, comprising a processor, a memory, and a computer program stored on the memory and capable of running on the processor; wherein, when the computer program is executed by the processor, the processor is caused to:

determine, a target sub-model of a model to be rendered, wherein the model to be rendered is to be displayed on a graphical user interface provided by the electronic device during running of a 3D game, the model to be rendered comprises a plurality of sub-models, each of the plurality of sub-models comprises a layer level, the target sub-model is one of the plurality of sub-models, and a layer level number of the target sub-model is a target layer level number;

perform rendering on the target sub-model, and storing a display position of a front pixel point corresponding to the target sub-model into a buffer area in the memory; and remove, during performing rendering on a first sub-model in the model to be rendered, a pixel point of the first sub-model, wherein the pixel point of the first sub-model is one of pixel points corresponding to the first sub-model, a display position corresponding to the pixel point of the first sub-model is the same as the display position stored in the buffer area, and the first sub-model is one of the plurality of sub-models and is different from the target sub-model.

17. The electronic device according to claim 16, wherein performing rendering on the target sub-model, and storing the display position of the front pixel point corresponding to the target sub-model into the buffer area, comprises:

performing back removal rendering on the target sub-model, and storing the display position of the front pixel point corresponding to the target sub-model into the buffer area.

18. The electronic device according to claim 16, wherein the target sub-model is one of sub-models corresponding to a coverage area of the target sub-model, and the layer level number of the target sub-model is a maximum layer level number.

19. A non-transitory computer-readable storage medium, wherein a computer program is stored on the computer-readable storage medium, and when the computer program is executed by a processor of an electronic device, a method for rendering a 3D model in a 3D game is implemented, and the method comprises:

determining, by the processor, a target sub-model of a model to be rendered, wherein the model to be rendered is to be displayed on a graphical user interface provided by the electronic device during running of the 3D game, the model to be rendered comprises a plurality of sub-models, each of the plurality of sub-models comprises a layer level, the target sub-model is one of the plurality of sub-models, and a layer level number of the target sub-model is a target layer level number;

performing, by the processor, rendering on the target sub-model, and storing a display position of a front pixel point corresponding to the target sub-model into a buffer area in a memory of the electronic device; and removing by the processor, during performing rendering on a first sub-model in the model to be rendered, a pixel point of the first sub-model; wherein the pixel point of the first sub-model is one of pixel points corresponding to the first sub-model, a display position corresponding to the pixel point of the first sub-model is the same as the display position stored in the buffer area, and the first sub-model is one of the plurality of sub-models and is different from the target sub-model.

20. The non-transitory computer-readable storage medium according to claim 19, wherein performing rendering on the target sub-model, and storing the display position of the front pixel point corresponding to the target sub-model into the buffer area, comprises:

performing back removal rendering on the target sub-model, and storing the display position of the front pixel point corresponding to the target sub-model into the buffer area.

* * * * *